(No Model.) 2 Sheets—Sheet 1.
W. H. UNDERWOOD.
COMBINED SPREADER AND STOPPER FOR MUCILAGE AND OTHER BOTTLES.
No. 378,744. Patented Feb. 28, 1888.
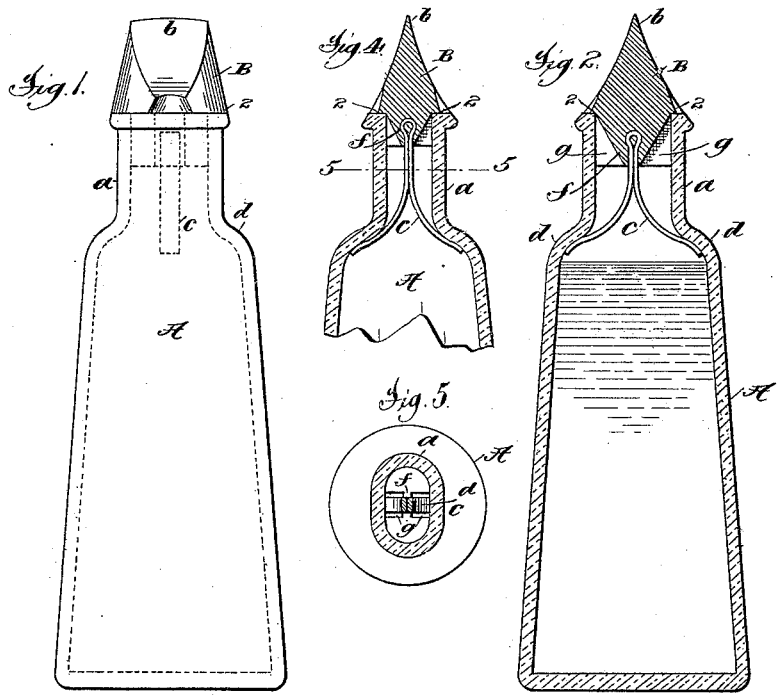
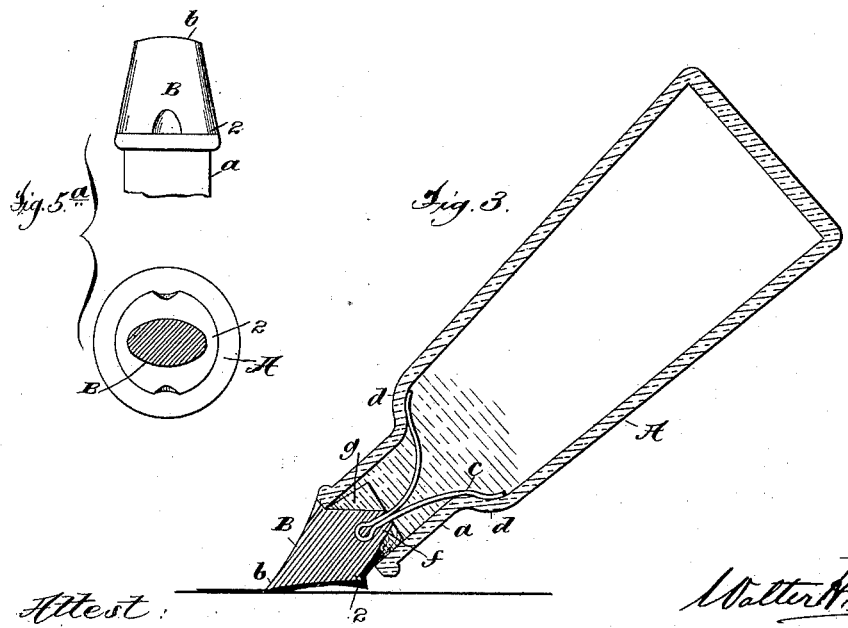
Attest:
Geo. H. Botts.
G. M. Borst.
Inventor:
Walter H. Underwood
by Philipp Phelps & Hovey
Attys.

(No Model.) 2 Sheets—Sheet 2.
W. H. UNDERWOOD.
COMBINED SPREADER AND STOPPER FOR MUCILAGE AND OTHER BOTTLES.
No. 378,744. Patented Feb. 28, 1888.
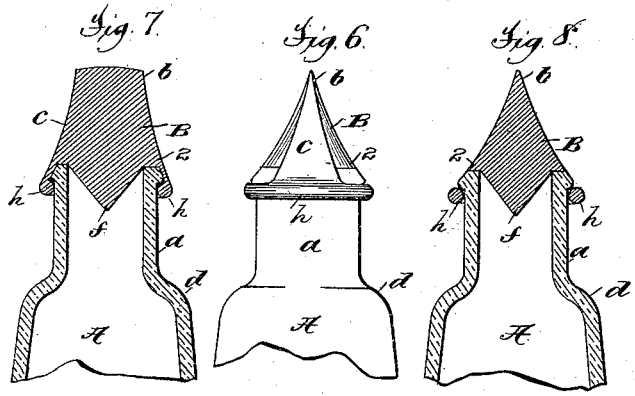
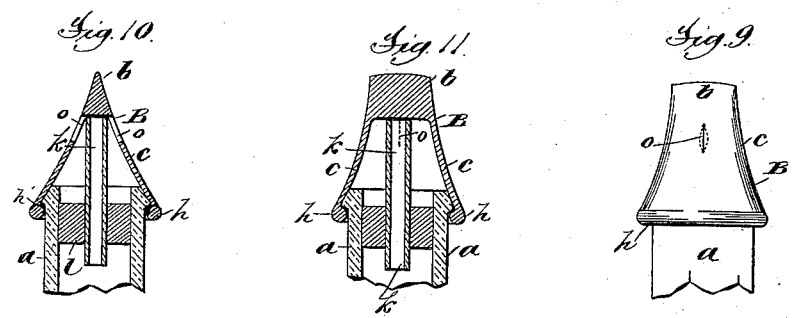
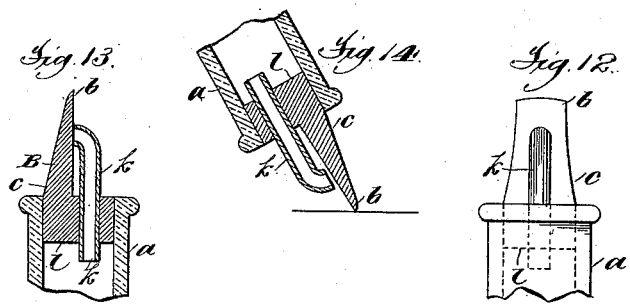
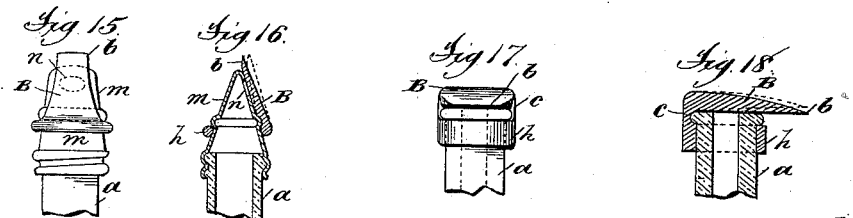

UNITED STATES PATENT OFFICE.

WALTER H. UNDERWOOD, OF DENVER, COLORADO.

COMBINED SPREADER AND STOPPER FOR MUCILAGE AND OTHER BOTTLES.

SPECIFICATION forming part of Letters Patent No. 378,744, dated February 28, 1888.

Application filed September 15, 1887. Serial No. 249,758. (No model.)

*To all whom it may concern:*

Be it known that I, WALTER H. UNDERWOOD, a citizen of the United States, residing at Denver, county of Arapahoe, and State of Colorado, have invented certain new and useful Improvements in Combined Spreader and Stopper for Mucilage and other Bottles, fully described and represented in the following specification and the accompanying drawings, forming a part of the same.

This invention relates to a combined spreader and stopper for mucilage and other similar liquid bottles or receptacles, which is designed to afford means for automatically closing the discharge-opening of the bottle against the admission of air and the escape of the liquid when the bottle is not in use, and also means for spreading or distributing the mucilage or other liquid upon the surface to which it is to be applied.

The invention, broadly stated, consists in a spreader or distributer which is designed to take the place of a brush or similar device for spreading the liquid upon the surface to which it is to be applied, and which is arranged so that when in its normal position it closes the discharge-opening of the bottle, the spreader being connected to the bottle by a flexible elastic connection which will yield so as to permit the spreader to move when pressure is applied to it, (as in the act of spreading the mucilage or other liquid upon the surface to which it is being applied,) so as to open or partly open the discharge-opening, and thus allow the contents of the bottle to escape, and which, by reason of its elasticity, will, as soon as the pressure is removed from the spreader, restore the latter to its normal position, so as to close the discharge-opening and prevent the entrance of air and the escape of the liquid.

The form and arrangement of the combined spreader and stopper, and also the form of the elastic connection between it and the bottle, may be considerably varied without departing from the essential feature of the invention, as above stated.

In order, therefore, to give a full understanding of the nature of the invention, it will now be described in detail, reference being had to the accompanying drawings, in which are illustrated a number of different forms, all embodying the substantial feature of the invention.

In said drawings, Figure 1 is a side elevation of an ordinary form of mucilage-bottle provided with one form of the combined spreader and stopper embodying the invention. Fig. 2 is a vertical section of the same. Fig. 3 is a view similar to Fig. 2, illustrating the manner of using the spreader in applying the mucilage or other contents of the bottle. Fig. 4 is a view similar to Fig. 2, showing the spreader and stopper applied to a bottle having an oval or flat instead of a round discharge-opening. Fig. 5 is a cross-section taken on the line 5 5. Figs. 5$^a$ and 6 to 18 illustrate modifications in the form of the spreader and stopper, in the form of the discharge-opening of the bottle, and in the form and arrangement of the flexible elastic connection for securing the spreader and stopper to the bottle.

Referring, now, particularly to Figs. 1, 2, and 3, it is to be understood that the bottle A, as therein shown, is an ordinary form of mucilage-bottle, and is provided with a round neck, *a*, which forms the discharge-opening of the bottle. The combined spreader and stopper B consists of a block of soft rubber or similar material, the lower portion, *f*, of which fits into the neck of the bottle, and is channeled at its sides, as indicated at *g*, to provide passages which lead to the end of the bottle-neck. The upper end of the combined spreader and stopper is flattened at its sides, so as to form a spreader, *b*, and is provided with a shoulder, 2, which fits onto the end of the bottle-neck, so as to close the discharge-opening. The lower portion, *f*, is provided with a forked spring, *c*, which extends inward and the arms of which are spread, so as to engage with the shoulders *d* below the neck of the bottle. This spring is made of light flexible metal, so as to form a flexible and elastic connection between the spreader and stopper and the bottle, which operates to normally hold the former in the position shown in Figs. 1 and 2, so as to keep the discharge-opening or neck of the bottle closed to prevent the admission of air or the escape of the contents.

With the device thus formed and connected to the bottle in this manner, it is only necessary, in order to apply the contents of the bottle to a surface, to invert the bottle, as shown in Fig. 3, and pass the spreader over the surface to which the mucilage or other contents of the bottle is to be applied, the same as in using an ordinary brush. The pressure thus given to the spreader will tilt it to one side against the tension of the elastic spring $c$, and thus open a small space at the edge of the neck of the bottle, as indicated, so as to allow a small portion of the contents of the bottle to escape and flow downward on the side of the spreader, where, meeting the spreader, it will be spread or distributed over the surface the same as it would be by an ordinary brush. As soon as the pressure is removed from the spreader by lifting it away from the surface to which the contents of the bottle are being applied, the spring-connection $c$ will at once restore it to its normal position, as shown in Fig. 2, so as to close the opening of the bottle, as before explained.

The foregoing illustrates and explains the principal or essential feature of the invention; but, as before stated, the form of the device, and also the form of the discharge-opening in the bottle, and also the form of the elastic connection with the bottle, may be varied widely without departing from this essential feature. For example, as shown in Figs. 4 and 5, the spreader and the elastic connection $c$ are the same as just described; but the form of the discharge-opening of the bottle, instead of being round, is oval or flat, and, as shown in Fig. 5$^a$, the form of the spreader is changed from flat to oval.

The construction shown in Figs. 6, 7, and 8 is also substantially the same; but in this case the portion $f$ is made simply in the form of a cone, which serves to center the device over the bottle-neck. The flexible connection $c$ in this case, instead of being formed of a metal spring, consists of portions $c$, formed integral with the block B, and extending from its sides and uniting with an elastic ring, $h$, which is adapted to be sprung over the end of the bottle-neck. The manner of using and the operation of the device when thus constructed is exactly the same as already described, and will be readily understood without a detailed description.

The construction shown in Figs. 9, 10, and 11 differs from that just described mainly in the form of the discharge-opening of the bottle. In this case the contents of the bottle, instead of being discharged directly from the mouth of the neck $a$, are discharged through a small tube, $k$, extending through a cork or other stopper, $l$, inserted in the bottle-neck, thus, in effect, forming but a contracted extension of the bottle-neck. In this case the spreader, instead of resting directly upon the bottle-neck, rests upon and closes the end of the small tube $k$, and the connecting portions $c$ are lengthened and extended entirely around the base of the spreader, but are slit at $o$. The manner of using and the operation of the device when thus constructed is substantially the same as already described. When pressure is applied to the spreader, it will be tilted to one side, thus causing the end of the tube to press open the slit $o$ and allow the contents to escape and be spread.

In the construction shown in Figs. 12, 13, and 14 the discharge-opening of the bottle is the same as in the construction last described, except that the tube $k$ is bent so as to form a lateral opening. To meet the change in the position of the discharge-opening, the spreader is made integral with the cork or stopper $l$ and extends vertically, so as to press against and close the same. The spreader being made of soft rubber or other flexible elastic material, its lower portion forms the flexible elastic connection $c$ with the stopper $l$, so that when pressure is applied to the spreader $b$ it will be bent away from the discharge-opening, as shown in Fig. 14, so as to open the latter and allow the contents of the bottle to escape. As soon as the pressure is removed, the elasticity of the material causes the spreader to reassume its normal position, so as to close the mouth of the tube $k$.

The construction shown in Figs. 15 and 16 is substantially the same as that just described, except that in this case the neck of the bottle is provided with a cap, $m$, having an opening, $n$, in its side. This cap also, in effect, forms but a contracted extension of the bottle-neck. In this case the spreader $b$ rests against the side of the cap $m$ and is provided with a flexible band, $h$, which is sprung over the end of the cap, so as to normally hold it in position to close the opening in the cap. When pressure is applied to the spreader, however, it will be sprung away from the cap, as indicated by dotted lines, so as to allow the contents to escape and be spread. The band $h$ in this case forms the flexible elastic connection with the bottle.

The construction shown in Figs. 17 and 18 is also substantially the same as the last two forms described; but in this case the stopper portion of the device is arranged to fit against the end of the bottle-neck, with its spreader $b$ extending to one side of the neck. The device is secured to the neck by means of an elastic band which is sprung around the neck of the bottle.

In using the device thus constructed the operation will be the same as already described, except that the bottle will be held in more nearly a horizontal position, so that the pressure applied to the spreader $b$ will draw it away from the neck of the bottle, as indicated by dotted lines.

It will be seen from the foregoing that all of the different forms of the device and its connection which have been described, while differing as to minor details, embody the principal features of the invention, as hereinbefore stated. Still other modifications may readily be made, both in the form of the device and its connection with the bottle, without departing from the invention or losing its advantages; but the several forms shown are deemed sufficient to impart a full understanding of the invention and its principle and mode of operation.

What I claim is—

1. A combined spreader and stopper for mucilage and other similar bottles, which is formed and adapted to close the discharge-opening of the bottle and is provided with a flexible elastic connection for attaching it to the bottle, which holds it normally in position to close the discharge-opening of the bottle, but will yield when pressure is applied to the spreader, so as to open the discharge-opening, substantially as described.

2. The combination, with a mucilage or similar bottle, of a combined spreader and stopper formed and adapted to close the discharge-opening of the bottle, and a flexible elastic connection for connecting the same to the bottle, which normally holds the spreader and stopper in position to close the discharge-opening, but will yield when pressure is applied to the spreader, so as to open the discharge-opening, substantially as described.

In testimony whereof I have hereunto set my hand in the presence of two subscribing witnesses.

WALTER H. UNDERWOOD.

Witnesses:
T. H. PALMER,
GEORGE H. BOTTS.